United States Patent
Reuter et al.

(10) Patent No.: US 10,502,138 B2
(45) Date of Patent: Dec. 10, 2019

(54) DUAL PUMP FUEL SYSTEM WITH PUMP SHARING CONNECTION

(71) Applicant: Hamilton Sundstrand Corporation, Charlotte, NC (US)

(72) Inventors: Charles E. Reuter, Granby, CT (US); Sara E. Pacella, Windsor Locks, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 686 days.

(21) Appl. No.: 15/095,938

(22) Filed: Apr. 11, 2016

(65) Prior Publication Data

US 2017/0292451 A1   Oct. 12, 2017

(51) Int. Cl.
F02C 7/236 (2006.01)
F02C 7/22 (2006.01)
F02C 9/26 (2006.01)
F02C 7/232 (2006.01)

(52) U.S. Cl.
CPC ............... *F02C 7/236* (2013.01); *F02C 7/22* (2013.01); *F02C 7/232* (2013.01); *F02C 9/263* (2013.01)

(58) Field of Classification Search
CPC .. F02C 7/236; F02C 7/22; F02C 7/232; F02C 9/44; F02C 9/26; F02C 9/263; F02C 9/28; F05D 2260/606; F05D 2270/3015
See application file for complete search history.

(56) References Cited

U.S. PATENT DOCUMENTS

| | | |
|---|---|---|
| 6,651,441 B2 | 11/2003 | Reuter et al. |
| 8,511,330 B1 | 8/2013 | Rickis |
| 8,893,466 B2 * | 11/2014 | Reuter ............... F02C 9/263 60/39.281 |
| 9,140,191 B2 | 9/2015 | Haugsjaahabink |
| 9,222,418 B2 | 12/2015 | Bader et al. |
| 2007/0199301 A1 | 8/2007 | Shelby et al. |
| 2014/0076435 A1 | 3/2014 | Ballard et al. |
| 2014/0311599 A1 * | 10/2014 | Haugsjaahabink ....... F02D 1/02 137/565.11 |

FOREIGN PATENT DOCUMENTS

EP   1715161 A2   10/2006

OTHER PUBLICATIONS

Norriseal, "Series 7100 Flow-Lift Piston Check Valve", 2015, pp. 1-4 <https://norrisealwellmark.com/product/series-7100-flow-lift-piston-check-valve/> (Year: 2015).*
Extended European Search Report for EP Application No. 17160941.5 dated Aug. 25, 2017, 8 pages.
Communication Pursuant to Article 94(3) EPC for EP Application No. 17160941.5 dated Mar. 15, 2019, 6 pages.

* cited by examiner

*Primary Examiner* — Steven M Sutherland
*Assistant Examiner* — Thuyhang N Nguyen
(74) *Attorney, Agent, or Firm* — Kinney & Lange, P.A.

(57) ABSTRACT

A fuel system for an aircraft includes a main pump, a servo pump, a servo minimum pressure valve, and a servo pump bypass connection element. The main pump receives fuel from a source. The servo pump also receives fuel from the source. The servo minimum pressure valve receives fuel from the main pump supplied through a first line and the valve receives fuel from the servo pump supplied through a second line. The servo pump bypass connection element connects the first line and the second line.

18 Claims, 4 Drawing Sheets

DUAL PUMP FUEL SYSTEM WITH PUMP SHARING CONNECTION

BACKGROUND

The present disclosure relates generally to fuel systems for gas turbine engines. In particular, the present disclosure relates to fuel systems utilizing fuel flow from two fuel pumps to provide combustion fuel and to operate engine actuation systems.

In conventional fuel systems, a main fuel pump is used to deliver fuel to a fuel metering valve that provides fuel directly to fuel injectors in the combustion section of a gas turbine engine. Additionally, some of the fuel flow from the main fuel pump is circulated through actuators that operate other engine or aircraft systems. In some systems, the metering valve is controlled with a servo valve-controlled torque motor that provides fuel based on engine requirements for different speeds, and servo valve-controlled actuators are used to regulate airflow to active clearance control systems based on the fuel flow. The servo valves utilize fuel flow from the main fuel pump to provide actuation. The main fuel pump needs to be sized at a minimum to provide flow to the servo valves and to the injectors at start and idle engine speed, and at a maximum to provide flow to the servo valves and to the injectors under high power transient engine conditions, such as during take-off. Thus, the main fuel pump must have a large capacity to accommodate the entire engine operating envelope and to provide fuel to other various engine systems. Configuring the main fuel pump to have such large capacity can lead to inefficiencies and difficulties in controlling a fuel and actuation system, however. There is, therefore, a need for a more efficient and more easily controlled fuel and actuation system for gas turbine engines.

SUMMARY

According to one embodiment a fuel system for an aircraft includes a main pump, a servo pump, a servo minimum pressure valve, and a servo pump bypass connection element. The main pump receives fuel from a source. The servo pump also receives fuel from the source. The servo minimum pressure valve receives fuel from the main pump supplied through a first line and the valve receives fuel from the servo pump supplied through a second line. The servo pump bypass connection element connects the first line and the second line.

According to another embodiment a fluid management system includes a first pump, a second pump, a fluid dispensing nozzle, an actuator, a pressure valve, and a pressure valve bypass connection element. The first pump is in fluid communication with a fluid source. The second pump in fluid communication with the fluid source. The fluid dispensing nozzle is in fluid communication with the first pump. The actuator is in fluid communication with the second pump. The pressure valve includes a first opening in fluid communication with the first pump and a second opening in fluid communication with the second pump. The pressure valve bypass connection element is located near the first and second opening of the pressure valve and in fluid communication with the first pump and the second pump.

According to yet another embodiment a method of controlling a fluid flow system for a gas turbine engine includes dividing flow of a fluid between a first pump and a second pump to generate a first pressurized fluid flow and a second pressurized fluid flow. A first portion of the first pressurized fluid flow is then supplied to a first opening of a pressure valve. A first portion of the second pressurized fluid flow is then supplied to a second opening of the pressure valve. Additionally at least one of a second portion of the first pressurized fluid flow and a second portion of the second pressurized fluid flow is supplied to a pressure valve bypass connection element.

DETAILED DESCRIPTION

Figure 1A:
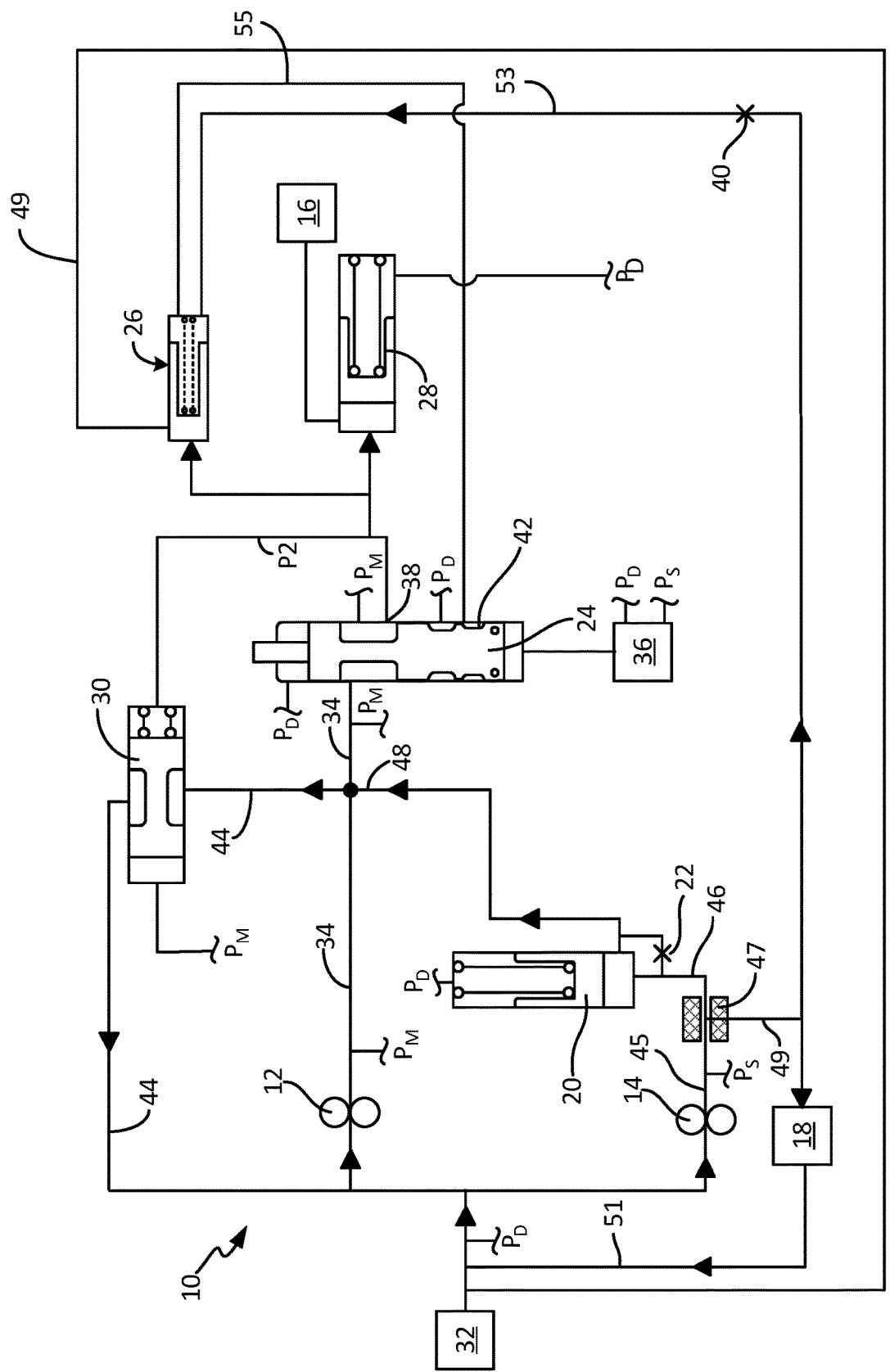
FIG. 1A is a schematic view of a fuel and actuation system in a run mode in which a servo minimum pressure valve bypass connection element allows fuel to bypass the servo minimum pressure valve.

FIG. 1A shows fuel and actuation system 10 in a run mode and illustrates main pump 12 and servo pump 14, each of which routes fuel to nozzles 16 and to actuators 18, respectively. System 10 also includes servo minimum pressure valve 20, minimum pressure valve bypass connection 22, metering valve 24, windmill bypass valve 26, shut-off valve 28, and pressure regulating valve 30. System 10 is provided with fuel from source 32, which can be, for example, a fuel tank located on an aircraft airframe or a boost pump that receives fuel from a fuel tank. The present disclosure is described with reference to a fuel system for a gas turbine engine that utilizes fuel flow to operate aircraft system actuators. However, the fuel and actuation system described herein may be used with other aircraft or non-aircraft systems.

Fuel located in source 32 is pumped out at pressure $P_D$, such as through the use of a boost pump (not shown) to main pump 12 and servo pump 14, respectively. Main pump 12 delivers fuel to nozzles 16 within a gas turbine engine combustor where a combustion process that consumes fuel occurs. Servo pump 14 provides fuel to actuators 18 to control various operations related to the gas turbine engine, and then returns the fuel to system 10. Main pump 12 and servo pump 14 are positive displacement pumps that are mechanically operated based on the shaft speed within the gas turbine engine to which they are coupled. Thus, at higher shaft speeds, pumps 12 and 14 provide higher volumetric flow rates of fuel. Fuel flow from each of main pump 12 and servo pump 14 can be used to compliment fuel flow from the other pump in various operating states of system 10. For example, servo pump 14 can boost output of main pump 12 during normal engine operating conditions (e.g. during high fuel demand conditions), while main pump 12 can boost output of servo pump 14 during engine start conditions (e.g. during low fuel demand conditions). At lower power conditions such as start, cruise, and idle, servo pump 14 brings the pressure of the flow of fuel to a fixed pressure $P_S$, higher than that of the flow of fuel pressurized by main pump 12 ($P_M$). The pressure value of $P_s$ can range from about three to five times higher than the value of $P_M$. The higher pressure is required because actuators 18 require a higher operating pressure of the flow of fuel than nozzles 16 require for operation. For example, actuators 18 can require a pressure of about 300 psi for proper operation whereas nozzles 16 can require a pressure of about 100 psi for proper operation.

A main flow of fuel from main pump 12 flows to metering valve 24 through main line 34 at pressure $P_M$ (e.g., 100 psi). Metering valve 24 can be actively controlled by a FADEC or EEC that operates servo motor 36. Servo motor 36 can be activated by an input current. Metering valve 24 includes main window 38 and shut-off port 42. From metering valve 24, fuel passes through shut-off valve 28 to engine nozzles 16. Shut-off valve 28 is spring-biased to a shut or closed position, but is held open in the run mode via pressure P2 of the flow of fuel from metering valve 24. Nozzles 16 provide fuel to a combustor within a gas turbine engine where a combustion process is executed that consumes the fuel. The combustion process operates the gas turbine engine to provide shaft power or thrust that drives an aircraft.

Metering valve 24 meters the flow of fuel in order to provide the correct amount of fuel to nozzles 16. Fuel not needed by nozzles 16 cannot pass through metering valve 24 and is routed through pressure regulating valve 30 back to main pump 12. Pressure regulating valve 30 allows fuel from the high pressure side of main pump 12 to be returned to the low pressure side of main pump 12 through return line 44. For example, main pump 12 operates to provide a steady flow of fuel to nozzles 16 at different operating speeds of the gas turbine engine. Sometimes, such as during steady state cruise conditions of the gas turbine engine, main pump 12 can provide more fuel than is needed by nozzles 16. In such scenarios, pressure regulating valve 30, returns unconsumed fuel back through system 10. In one embodiment, pressure regulating valve 30 is spring-biased to a shut or closed position, but is held open in the run mode via the pressure differential across the metering valve, $P_M$-P2. In another embodiment, metering valve 24 includes an electronically operated valve, such as a direct drive valve, that is controlled by a control system for the gas turbine engine.

A circulating flow of fuel from servo pump 14 flows through line 45 and to actuators 18 through servo line 49. Filter 47 removes contaminants from the fuel before being routed to actuators 18 to avoid formation of blockages. In one embodiment, filter 47 includes a wash filter. In one embodiment, actuators 18 include servo valves that are operated by fuel flow from servo pump 14 and current commands from the EEC. Actuators 18 can also include a compressor inlet guide vane actuator, a butterfly valve, a bleed valve, a turbine cooling valve, and a nozzle actuator. After being utilized by actuators 18, the fuel returns to the flow of fuel in system 10, such as through return line 51 into source 32.

Servo minimum pressure valve 20, which is a piston-actuated valve, ensures that actuators 18 receive a minimum effective pressure to operate (e.g., about 300 psi in some embodiments). Servo minimum pressure valve 20 receives a flow of circulating fuel from servo pump 14, through line 46. If the pressure of the fuel from servo pump 14 is below the minimum effective pressure, then the piston will be in a closed position. As the pressure of the fuel from servo pump 14 increases, the piston is actuated towards an open position, which allows a portion of the flow of fuel from servo pump 14 to enter main line 34 through line 48. If the pressure increases beyond the minimum effective pressure, the piston will be in the open position to allow a larger portion of the flow fuel from servo pump 14 to enter main line 34 through line 48. $P_D$ is communicated to the backside of the piston in order to keep the piston in the closed position when actuators 18 do not receive a flow of fluid at the minimum effective pressure. This allows the pressure in line 46 to build up to the minimum effective pressure required by actuators 18 for operation. Servo minimum pressure valve bypass connection 22 is included between lines 46 and 48 in order to allow fuel flow to be shared between lines 46 and 48. Connection 22, can constitute a line or a conduit. Additionally, if a portion of lines 46 and 48 lie adjacent to each other, then connection element can constitute an orifice between lines 46 and 48.

Connection 22 allows fuel to bypass servo minimum pressure valve 20 and flow directly between lines 46 and 48 depending on the pressure of the fuel within each line. Accordingly, in situations where the pressure of the fuel circulated from main pump 12 is greater than the pressure of the fuel circulated from servo pump 14, for example engine starting, a portion of the fuel from main pump 12 is routed through connection 22 to line 46, which in turn increases the pressure of the fuel therein that is circulated to actuators 18. Additionally, in situations where the pressure of the fuel circulated from servo pump 14 is greater than that of fuel circulated from main pump 12, a portion of the fuel from servo pump 14 is routed through connection 22 to line 48 to join the flow of fuel from main pump 12 in line 34. In this scenario the amount of fuel flowing through connection 22 does not prevent the piston of servo minimum pressure valve 20 from moving towards the open position.

Windmill bypass valve 26 is in flow communication with metering valve 24 and receives a flow of fluid at pressure $P_2$ from window 38 on a front side of windmill bypass valve 26. Windmill bypass valve 26 also receives a flow of fluid pressurized by servo pump 14 via shutdown orifice 40 and line 53, which connects to the backside of windmill bypass valve 26. In the run mode, the metering valve closes port 42 stopping flow through shutdown orifice 40. This results in the pressure supplied to the back side of windmill bypass valve 26 being equal to $P_S$, which is greater than the P2 pressure supplied to the front side of windmill bypass valve 26, This keeps windmill bypass valve 26 in a closed position.

Figure 1B:
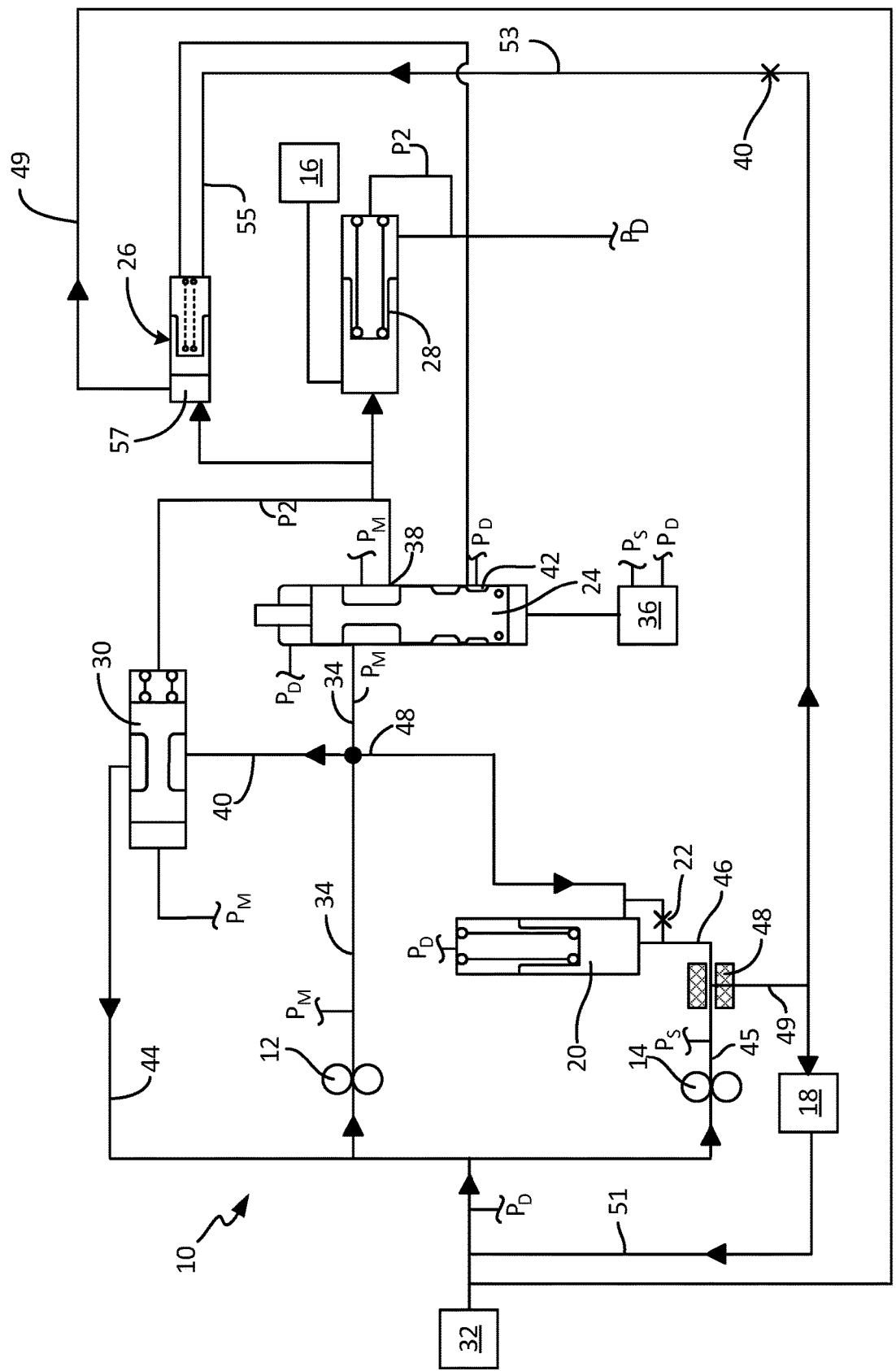
FIG. 1B is a schematic view of the fuel and actuation system of FIG. 1A in a shutdown mode.

FIG. 1B shows fuel and actuation system 10 in a shutdown mode. In addition to those features shown in FIG. 1A, FIG. 1B shows window 57 of windmill bypass valve 26. In the shutdown mode, metering valve 24 is activated by servo motor 36 to close-off fuel flow through window 38 to shut-off valve 28, causing shut-off valve 28 to close. Additionally, windmill bypass valve 26 is opened because the pressure supplied to the backside of windmill bypass valve 26 through shutdown orifice 40 and lines 53 and 55 is not sufficient to overcome the pressure of the fluid supplied to the front side of windmill bypass valve 26. This is because the metering valve is positioned to open port 42 to $P_D$, which connects a flow path from Ps to $P_D$ through shutdown orifice 40, and results in the pressure on the backside of the windmill bypass valve being approximately equal to $P_D$. Thus any fuel supplied to windmill bypass valve 26 is routed downstream of source 32 through window 57, which connects to line 49. To transition from the shutoff mode to a start mode, the metering valve is moved to the run position which closes port 42. This makes the pressure on the backside of windmill bypass valve 26 equal to servo pressure. Servo pressure of a minimum threshold must be supplied to windmill bypass valve 26 to overcome P2 pressure and fully close valve 26. Additionally, in start mode, servo pump 14 does not initially pressurize fuel in line 46 above the minimum threshold pressure, which causes remaining fuel from main pump 12 to flow through line 48 and connection 22 into line 46. As such, actuators 18 receive a combined flow of fuel from servo pump 14 and main pump 12 that is sufficient for the operation of actuators 18, even under low pump speed conditions such as start up. Additionally, the combined flow of fuel from servo pump 14 and main pump 12 is supplied to the back side of windmill bypass valve 26 through line 53 and shutdown orifice 40. This flow closes windmill bypass valve 26.

Figure 2A:
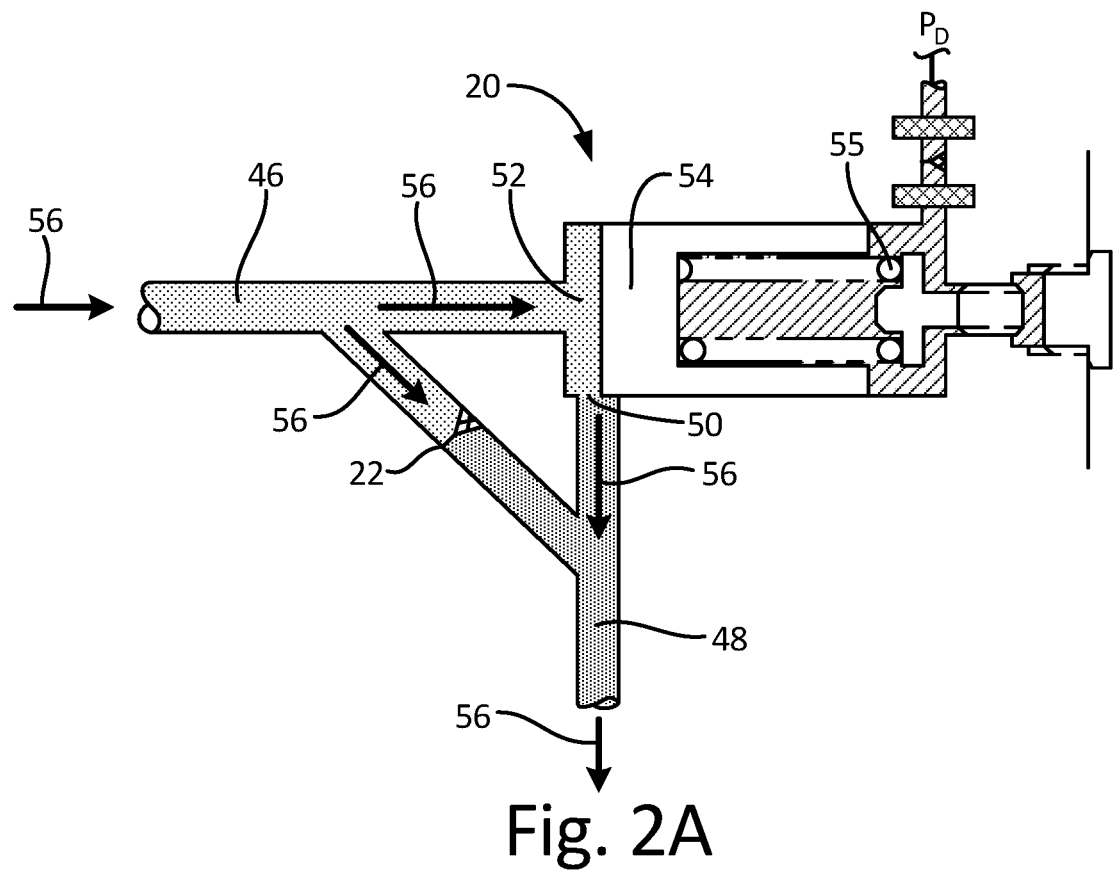
FIG. 2A is a schematic and partial sectional view of the servo minimum pressure valve in the run mode.

FIG. 2A is a schematic view of servo minimum pressure valve 20. FIG. 2A illustrates first opening 50, second opening 52, piston 54, and spring 55 of valve 20. Arrows 56 represent a flow of fuel from servo pump 14. Servo minimum pressure valve 20 is shown in run mode where the pressure created by the flow of fuel from servo pump 14 in line 46 is large enough to compress spring 55 and actuate piston 54 towards the open positon thereby exposing opening 52 to the flow of fuel and allowing the fuel to flow through line 48. Fuel also flows through connection 22 from line 46 to line 48.

Figure 2B:
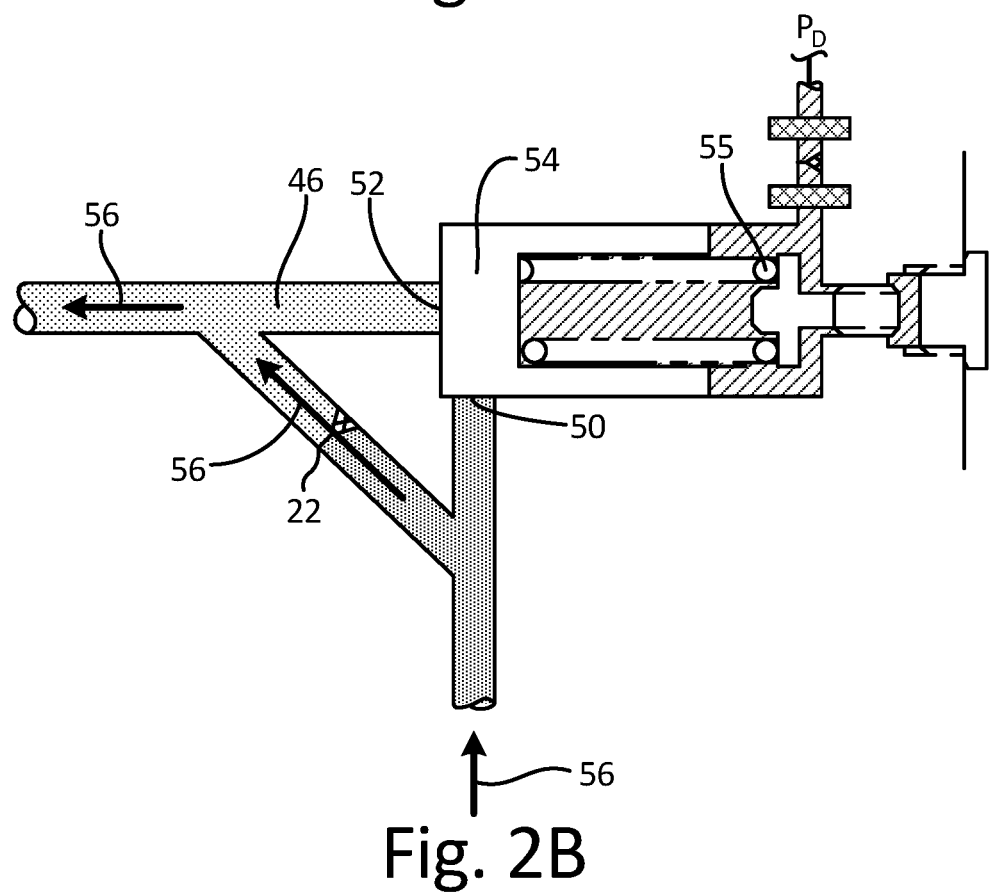
FIG. 2B is a schematic and partial sectional view of the servo minimum pressure valve in a startup mode.

FIG. 2B is a schematic view of servo minimum pressure valve 20 in start mode. When a gas turbine engine is starting up, servo pump 14 can be limited in its ability to pressurize fuel up to the minimum effective pressure as required by actuators 18 and to close windmill bypass valve 26. In this situation, the flow of fuel pressurized by main pump 12 is routed from line 48 through connection 22 to line 46 as shown by arrows 56. The combined flow of fuel in line 46 is then routed to actuators 18 and to the backside of windmill bypass valve 26. As pump speed increases, servo pump 14 is again capable of sufficiently pressurizing the flow of fuel, piston 54 will be actuated towards the open position and fuel will primarily flow from line 46 to line 48 through valve 20 and connection 22 as shown above with respect to FIG. 2A.

Figure 3:
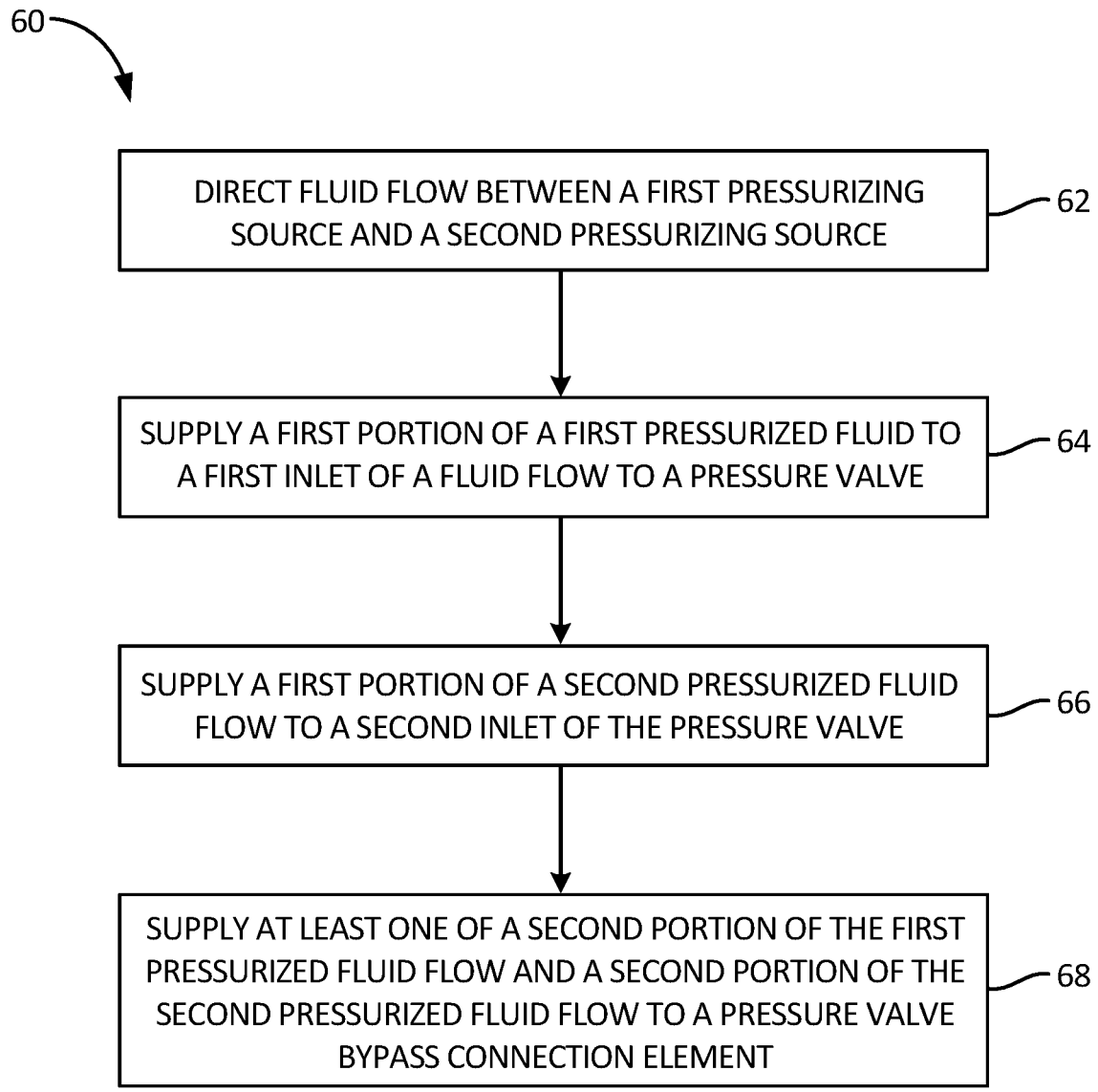
FIG. 3 is a flow diagram showing a method controlling fuel flow in a gas turbine engine.

FIG. 3 is a flow diagram showing method 60 for controlling fuel flow in a gas turbine engine. FIG. 3 illustrates division step 62, supplying step 64, supplying step 66, and supplying step 68. In division step 62 a flow of fuel from source 32 is divided between a first pressurizing source, such as main pump 12 and a second pressurizing source, such as servo pump 14. In supplying step 64 a first portion of the flow of pressurized fuel from main pump 12 is supplied to opening 52 of servo minimum pressure valve 20 by line 48. In supplying step 64 a first portion of the flow of pressurized fuel from servo pump 14 is supplied to opening 50 of servo minimum pressure valve 20 by line 46. Depending on whether the gas turbine engine is in run mode, shut down mode, or start mode, the flow of pressurized fuel from lines 46 and 48 can change as described above. In supplying step 68 at least one of a second portion of the pressurized flow of fuel from servo pump 14 or the pressurized flow of fuel from main pump 12 is supplied to pressure valve bypass connection 22.

There are many reasons to use system 10 including the following non-limiting reasons. As described above, pressure valve bypass connection 22 allows for a sharing of pressurized fuel flow from main pump 12 and servo pump 14. The sharing of pressurized fuel flow easily allows for the flow of fuel to actuators 18 and to windmill bypass valve 26 to be supplemented when the pressure generated by servo pump 14 alone is not sufficient. This allows servo pump 14 to be designed to be no larger than necessary. That is to say that because of pressure valve bypass connection 22, servo pump 14 does not have be designed to displace an unnecessarily large amount of fuel. This results in weight savings as the pump size is kept to a minimum. Additionally, less energy is consumed by servo pump 14 in that the power requirements for pump 14 are reduced. Moreover, the decrease in the required power of pump 14 results in a reduction in heat rejection from pump 14 to the fuel, which can reduce the need to cool the fuel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

DISCUSSION OF POSSIBLE EMBODIMENTS

The following are non-exclusive descriptions of possible embodiments of the present invention.

A fuel system for an aircraft, the fuel system comprising: a main pump that receives fuel from a source; a servo pump that receives fuel from the source; a servo minimum pressure valve, wherein the valve receives fuel from the main pump supplied through a first line and the valve receives fuel from the servo pump supplied through a second line; and a servo pump bypass connection element connecting the first line and the second line.

The fuel system of the preceding paragraph can optionally include, additionally and/or alternatively, any one or more of the following features, configurations and/or additional components:

A combustor can be configured to receive fuel from the main pump; and an actuator can be configured to receive fuel from the servo pump.

The actuator can be selected from the group consisting of: a butterfly valve, a bleed valve, a turbine cooling valve, and a nozzle actuator.

A boost pump can be in fluid communication with the fuel source, the main pump, and the servo pump.

The servo minimum pressure valve can include a first opening for receiving fuel from the main pump; a second opening for receiving fuel from the servo pump; and a piston located between the first opening and the second opening and actuatable between a first open position and a second closed position, wherein the piston is configured to actuate towards the first positon under a condition wherein a pressure of the fuel supplied by the servo pump exceeds a pressure of the fuel supplied by the main pump.

The piston can be configured to actuate towards the second positon under a condition wherein the pressure of the fuel supplied by the by the servo pump to a front side of the piston through the first opening is not sufficient to overcome a pressure supplied to a backside of the piston.

A fluid management system comprising: a first pump in fluid communication with a fluid source; a second pump in fluid communication with the fluid source; a fluid dispensing nozzle in fluid communication with the first pump; an actuator in fluid communication with the second pump; a pressure valve comprising: a first opening in fluid communication with the first pump; and a second opening in fluid communication with the second pump; and a pressure valve bypass connection element located near the first and second opening of the pressure valve and in fluid communication with the first pump and the second pump.

The fluid management system of the preceding paragraph can optionally include, additionally and/or alternatively, any one or more of the following features, configurations and/or additional components:

The nozzle can be located within a combustor of the gas turbine engine.

The actuator can actuate a component of a gas turbine engine selected from the group consisting of: a butterfly valve, a bleed valve, a turbine cooling valve, and a nozzle actuator.

The pressure valve can include a piston located between the first opening and the second opening and actuatable between a first open position and a second closed position, wherein the piston is configured to actuate towards the first positon under a condition wherein a pressure of the fluid supplied by the second pump exceeds a pressure of the fluid supplied by the first pump.

The piston can be configured to actuate towards the second positon under a condition wherein the pressure of the fuel supplied by the first pump exceeds the pressure of the fuel supplied by the second pump.

The first pump can be configured to raise a first portion of fluid to a first pressure and the second pump is configured to raise a second portion of the fluid to a second pressure different than the first pressure.

The second pressure can be greater than the first pressure.

The second pressure can be approximately three times greater than the first pressure.

The first pump and the second pump can be positive displacement pumps.

A method of controlling a fluid flow system for a gas turbine engine includes the steps of: dividing flow of a fluid between a first pump and a second pump to generate a first pressurized fluid flow and a second pressurized fluid flow; supplying a first portion of the first pressurized fluid flow to a first opening of a pressure valve; supplying a first portion of the second pressurized fluid flow to a second opening of the pressure valve; and supplying at least one of a second portion of the first pressurized fluid flow and a second portion of the second pressurized fluid flow to a pressure valve bypass connection element.

The method of the preceding paragraph can optionally include, additionally and/or alternatively, any one or more of the following features, configurations and/or additional components:

The second pressurized fluid flow can have a higher pressure than the first pressurized fluid flow.

The second portion of the first pressurized fluid flow can be supplied to the pressure valve bypass connection element under a condition wherein the pressure of the first pressurized fluid is higher than the pressure of the second pressurized fluid flow.

The pressure of the second pressurized fluid flow can be three times greater than the pressure of the first pressurized fluid flow.

Fluid can be supplied to the first pressurizing source and the second pressurizing source from a boost pump located between a fuel tank and the first pressurizing source and the second pressurizing source.

The invention claimed is:

1. A fuel system for an aircraft, the fuel system comprising:
   a main pump that receives fuel from a source;
   a servo pump that receives fuel from the source;
   a servo minimum pressure valve comprising:
      a first opening for receiving fuel from the main pump;
      a second opening for receiving fuel from the servo pump; and
      a piston located between the first opening and the second opening and actuatable between an open position and a closed position, wherein the piston is configured to actuate towards the open position under a first operating condition wherein a pressure of the fuel supplied by the servo pump exceeds a pressure of the fuel supplied by the main pump,
      wherein the servo minimum pressure valve receives fuel from the main pump supplied through a first line and the servo minimum pressure valve receives fuel from the servo pump supplied through a second line; and
   a servo pump bypass connection element connecting the first line and the second line, such that during the first operating condition, fuel travels along the bypass connection element in a first direction from the first line to the second line, and during a second operating condition, the fuel travels along the bypass connection element in a second direction opposite the first direction from the second line to the first line.

2. The fuel system of claim 1, and further comprising:
   a combustor configured to receive fuel from the main pump; and
   an actuator configured to receive fuel from the servo pump.

3. The fuel system of claim 2, wherein the actuator is selected from the group consisting of: a butterfly valve, a bleed valve, a turbine cooling valve, and a nozzle actuator.

4. The fuel system of claim 1, and further comprising:
   a boost pump in fluid communication with the fuel source, the main pump, and the servo pump.

5. The fuel system of claim 1, wherein the piston is configured to actuate towards the closed position under the second operating condition wherein the pressure of the fuel supplied by the servo pump to a front side of the piston through the first opening is not sufficient to overcome a pressure supplied to a backside of the piston.

6. A fluid management system comprising:
   a first pump in fluid communication with a fluid source;
   a second pump in fluid communication with the fluid source;
   a fluid dispensing nozzle in fluid communication with the first pump;
   an actuator in fluid communication with the second pump;
   a pressure valve comprising:
      a first opening in fluid communication with the first pump via a first line; and
      a second opening in fluid communication with the second pump via a second line; and
      a piston located between the first opening and the second opening and actuatable between an open position and a closed position, wherein the piston is configured to actuate towards the open position under a first operating condition wherein a pressure of the fluid supplied by the second pump exceeds a pressure of the fluid supplied by the first pump; and
   a pressure valve bypass connection element located near the first and second opening of the pressure valve and in fluid communication with the first pump and the second pump, via the first and second lines, respectively;
   wherein during the first operating condition, fluid travels along the bypass connection element in a first direction from the first line to the second line, and during a second operating condition, fluid travels along the bypass connection element in a second direction opposite the first direction from the second line to the first line.

7. The fluid management system of claim 6, wherein the fluid dispensing nozzle is located within a combustor of a gas turbine engine.

8. The fluid management system of claim 6, wherein the actuator actuates a component of the gas turbine engine, the component being one of: a butterfly valve, a bleed valve, a turbine cooling valve, and a nozzle actuator.

9. The fluid management system of claim 6, wherein the piston is configured to actuate towards the closed position under the second operating condition wherein the pressure of the fuel supplied by the first pump exceeds the pressure of the fuel supplied by the second pump.

10. The fluid management system of claim 6, wherein the first pump is configured to raise a first portion of fluid to a first pressure and the second pump is configured to raise a second portion of the fluid to a second pressure different than the first pressure.

11. The fluid management system of claim 10, wherein the second pressure is greater than the first pressure.

12. The fluid management system of claim 11, wherein the second pressure is approximately three times greater than the first pressure.

13. The fluid management system of claim 6, wherein the first pump and the second pump are positive displacement pumps.

14. A method of controlling the fluid management system of claim 6, the method comprising the steps of:
dividing flow of a fluid between the first pump and the second pump to generate a first pressurized fluid flow and a second pressurized fluid flow;
supplying a first portion of the first pressurized fluid flow to the first opening of the pressure valve via the first line;
supplying a first portion of the second pressurized fluid flow to the second opening of the pressure valve via the second line; and
supplying at either of a second portion of the first pressurized fluid flow and a second portion of the second pressurized fluid flow to the pressure valve bypass connection element such that during the first operating condition, the second portion of the first pressurized fluid flow travels along the bypass connection element in a first direction from the first line to the second line, and during the second operating condition, the second portion of the second pressurized fluid flow travels along the bypass connection element in a second direction opposite the first direction from the second line to the first line.

15. The method of claim 14, wherein the second pressurized fluid flow has a higher pressure than the first pressurized fluid flow.

16. The method of claim 15, wherein the second portion of the first pressurized fluid flow is supplied to the pressure valve bypass connection element under the first operating condition wherein the pressure of the first pressurized fluid is higher than the pressure of the second pressurized fluid flow.

17. The method of claim 15, wherein the pressure of the second pressurized fluid flow is three times greater than the pressure of the first pressurized fluid flow.

18. The method of claim 14, and further comprising the step of:
supplying fluid to the first pressurizing source and the second pressurizing source from a boost pump located between a fuel tank and the first pressurizing source and the second pressurizing source.

* * * * *